United States Patent [19]

Dawson et al.

[11] Patent Number: 5,156,739
[45] Date of Patent: Oct. 20, 1992

[54] SYSTEM FOR PURIFYING AND DEGASIFYING WATER BY REVERSE OSMOSIS

[75] Inventors: Bruce M. Dawson, Concord; Adam D. Foley, Westwood; Gary A. O'Neill, Tyngsborough; Frank Firicano, Peabody, all of Mass.

[73] Assignee: Millipore Corporation, Bedford, Mass.

[21] Appl. No.: 771,384

[22] Filed: Sep. 30, 1991

[51] Int. Cl.$^5$ .............................................. B01D 63/02
[52] U.S. Cl. ............................ 210/321.8; 210/321.89; 210/500.23
[58] Field of Search ............... 210/259, 25 B, 257.2, 210/416.1, 195.2, 321.6, 321.72, 321.78, 321.79, 321.8, 321.81, 321.87, 321.88, 321.89, 321.9, 500.23

[56] References Cited

U.S. PATENT DOCUMENTS 4,391,713 7/1983 Smith .................................. 210/259

Primary Examiner—Frank Sever
Attorney, Agent, or Firm—Andrew T. Karnakis; Paul J. Cook

[57] ABSTRACT

Water to be purified and degassed is passed through a reverse osmosis step which a pure water stream and a high pressure waste water stream are produced. The high pressure waste water is passed through an eductor to produce a vacuum. The pure water stream is passed into a first volume of a degassifier and the vacuum is directed to a second volume of the degassifier. The first and second volume of the degassifier are separated by a hydrophobic membrane.

16 Claims, 2 Drawing Sheets

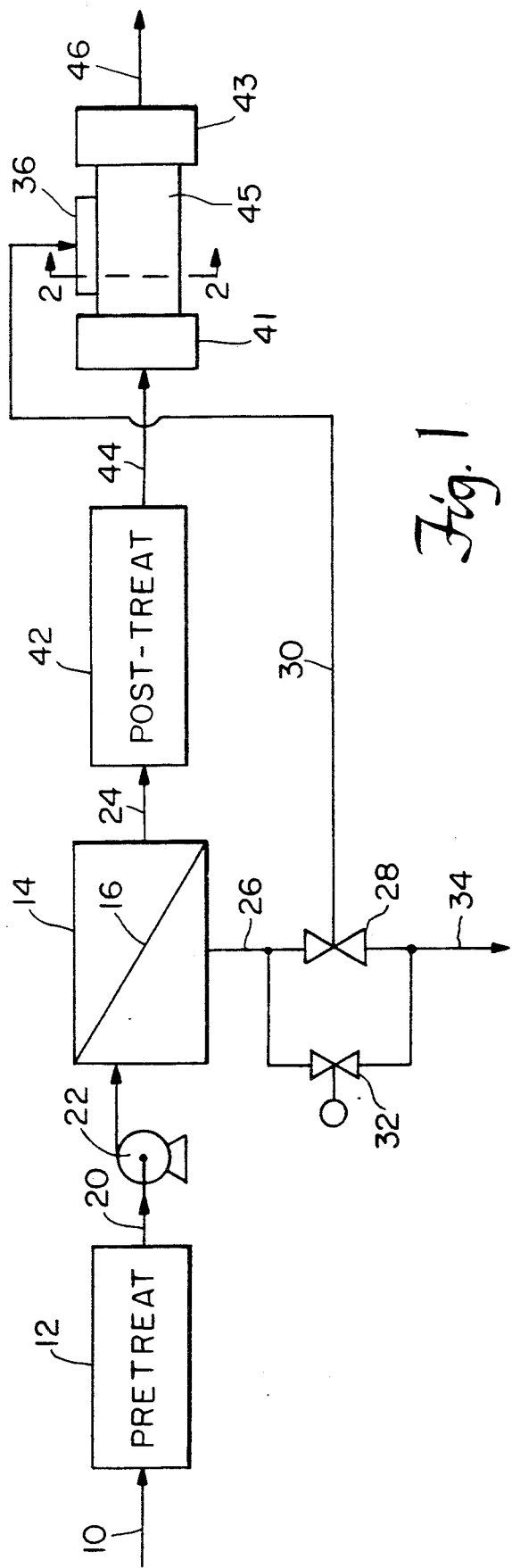
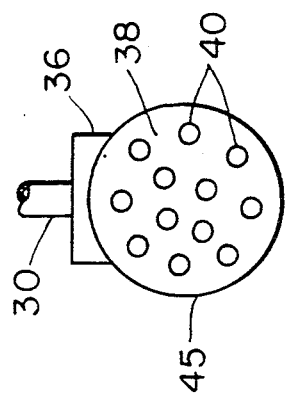
Fig. 1
Fig. 2

SYSTEM FOR PURIFYING AND DEGASIFYING WATER BY REVERSE OSMOSIS

BACKGROUND OF THE INVENTION

This invention relates to a method and system for producing degasified purified water utilizing reverse osmosis. More particularly this invention relates to a method and system for purifying water by reverse osmosis followed by degasifying by indirect exposure of water to low pressure across a hydrophobic membrane.

At the present time a reverse osmosis step is used to remove impurities, primarily microorganisms, pyrogens and ionic material from water by utilizing a reverse osmosis membrane. Usually, reverse osmosis is conducted by contacting the incoming water tangentially to the membrane so that the waste water comprising the retentate washes the membrane to reduce accumulation of impurities retained on the membrane during use. The fraction of the total water which comprises the retentate varies depending on the quality of feed water, desired product quality and the type of membrane material employed in the reverse osmosis unit. In a common mode of operation, between about 80 and 90% of the incoming water to the reverse osmosis step washes the upstream surface of the reverse osmosis membrane and is removed as retentate or waste. The remaining portion of the incoming water passes through the reverse osmosis membrane as purified water. This mode of operation, wherein a large percentage of the water constitutes reject water, is necessary in order to prevent premature plugging of the reverse osmosis membrane.

In some modes of use, it is necessary to degasify purified water such as when the water is utilized in analytical apparatus for cleaning, dilution or in a mixture with reagents at elevated temperature, usually about 37° C. As the temperature of the water is increased, some fraction of the gases which were soluble at the inlet temperature (usually <37° C.) become insoluble and form bubbles. These bubbles render the measurements taken with the analytical apparatus inaccurate due to refraction of ultraviolet and visible light typically used to make the measurements.

Presently, product water from a reverse osmosis unit can be degasified by a vacuum generated with a pump. The use of a pump is undesirable since it requires the use of expensive protection devices such as water traps, dessicators and vacuum regulators. In addition, the use of a vacuum pump is undesirable because of the cost of this additional component. In addition, should any of the protection devices fail, the pump will likely be ruined by water intrusion on its vacuum side.

It is disclosed in U.S. Pat. No. 4,391,713 to purify water with a reverse osmosis unit and to remove carbon dioxide which was deliberately generated from purified water by a vacuum generated in an eductor unit. The vacuum is generated by passing waste water from the reverse osmosis unit through the eductor. The purified water is directed to a storage tank having an open gas volume above the top surface of the stored purified water. The vacuum produced within the eductor is effected above the open gas volume. Water in the tank is recirculated and sprayed onto the top surface of the stored water so that the sprayed water releases its carbon dioxide. Filtered air is introduced into the open gas volume to sweep up the free carbon dioxide and to remove it under the reduced pressure generated by the eductor. This system is undesirable since it requires a noncontinuous batch process wherein only a volume of water equal to that of the storage tank can be treated at a given time. After treatment is complete, the treated water is removed and the tank is filled with a new volume of water. In addition, a means for providing a clean volume of sweeping gas is required which may introduce a new gas into the water. Accordingly, it would be desirable to provide a system for degasifying purified water which permits continuous processing of the water and which eliminates the need for a sweeping gas. In addition, it would be desirable to provide such a system which eliminates the need for expensive pumps.

SUMMARY OF THE INVENTION

This invention provides a process for continuously degasifying purified water produced in a reverse osmosis step. The process comprises directing purified water from a reverse osmosis step to a step of passing the purified water through a volume positioned between hydrophobic membrane surfaces and subjecting a gas volume exterior of the hydrophobic membrane surfaces to a reduced pressure. Additional water purification steps can be utilized between the reverse osmosis step and the degasifying or prior to the reverse osmosis step. The reduced pressure is effected by passing waste water from the reverse osmosis step through an eductor. The purified water can be passed continuously between the membrane surfaces and the gas is removed therefrom without utilizing a sweeping gas. In addition, the use of the eductor eliminates the need for utilizing a pump. The use of the eductor is also better than using a vacuum pump because if any water intrudes the hydrophobic membrane and is drawn to the vacuum side, it is simply pulled through the educator and sent to waste. Thus, this system is self voiding.

BRIEF DESCRIPTION OF THE DRAWINGS

FIG. 1 illustrates the process of this invention.

FIG. 2 is a cross-sectional view of the degasifier taken along line 2—2 of FIG. 1.

DESCRIPTION OF SPECIFIC EMBODIMENTS

Figure 3:
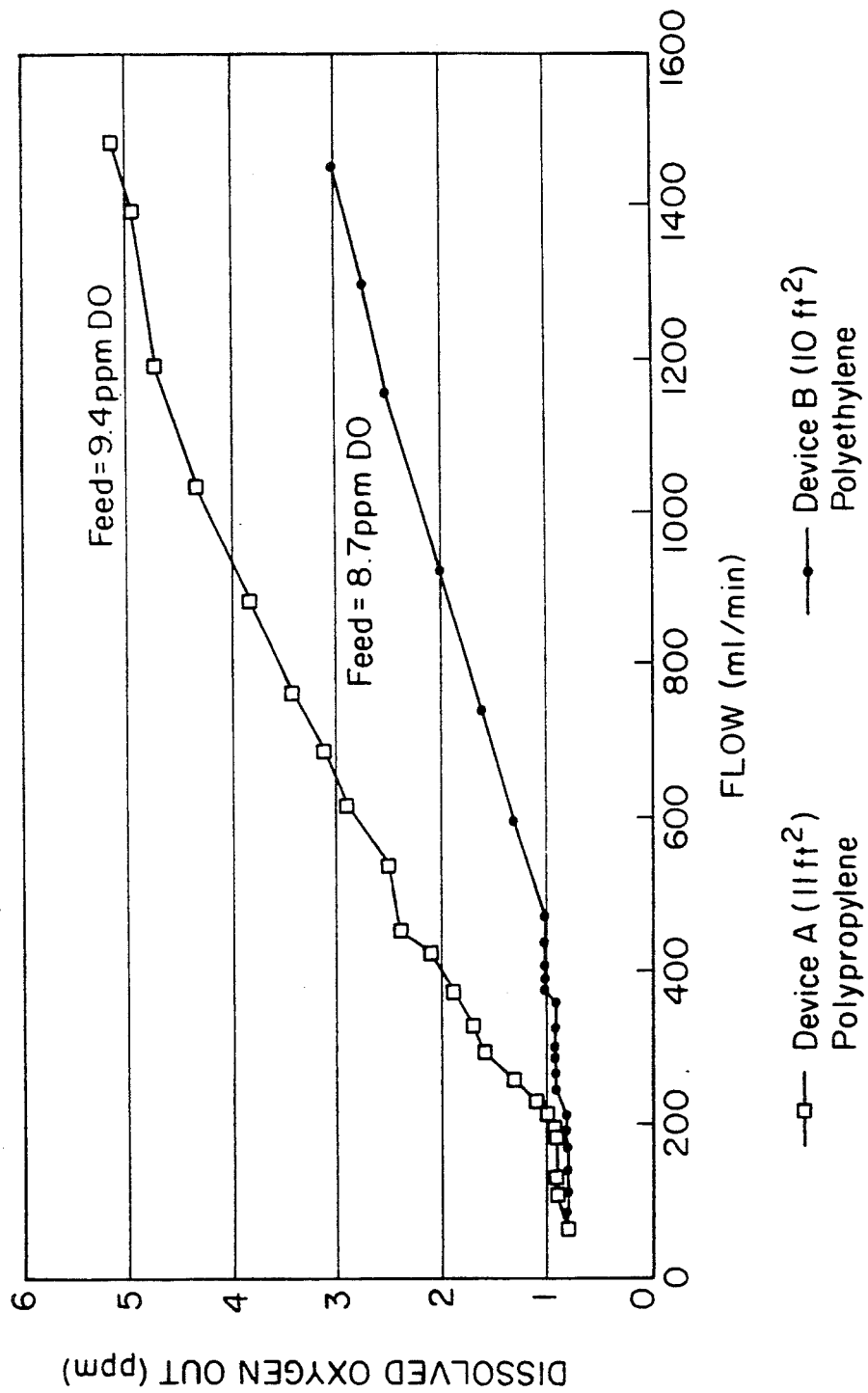
FIG. 3 shows oxygen removal as a function of product water flow rate.

Water to be purified, typically tap water, is directed to a purification system which includes a reverse osmosis step and conventional waste purification pretreatment steps and water post-treatment steps associated with the reverse osmosis step. The primary function of these pretreatment and post-treatment steps is to remove impurities in the water including ions, microorganisms and pyrogens. In the reverse osmosis step, water to be purified under pressure, is contacted with a reverse osmosis membrane under conditions such that between about 5 and 50 volume percent of the incoming water is passed through the membrane while the remaining water comprises a waste water stream. The waste water stream generally has a pressure between about 65 and 250 psig. When less than about 5 volume percent of the incoming water is passed through the reverse osmosis membrane, the process becomes uneconomical. When greater than about 50 volume percent of the water is passed through the membrane, the membrane becomes degraded rapidly due to a build up of impurities such as scale or colloidal matter on the membrane, thus rendering it nonusuable for its intended purpose. Under the desired conditions of operation, there is a sufficient volume of waste water available at a sufficiently high pressure to produce the desired vacuum when passed through an appropriate eductor. The desired vacuum is at least about −20 inches Hg., and preferably at least about −28 in Hg. The vacuum produced within the eductor is in indirect communication with a gas volume which surrounds hydrophobic membranes through which the purified water produced in the reverse osmosis step is passed. The purified water is not directly exposed to the vacuum. The vacuum force is exerted indirectly on the water through hydrophobic membranes. Gas in the purified water passes through the membranes while water is prevented from passing through the membrane due to the membrane's hydrophobicity. The hydrophobic membrane can have any configuration so long as the membranes separate the purified water from direct exposure to the vacuum generated by the eductor. For example, the hydrophobic membrane can be hollow fibers or separated sheets which are sealed appropriately to allow passage of water through the volume defined by the separated membrane sheets while the vacuum is exposed directly to a gas volume outside of the sealed volume for the water. The hollow fibers can have an internal diameter of between about 100 microns and 800 microns and the membrane sheets can be spaced apart a distance within that same range in order to attain effective degassing without excessively long residence times. Any other device effective to isolate the water to be degassed from the low pressure source through the use of a hydrophobic membrane can also be used. The purified and degasified water then is recovered and can be used in a variety of environments such as in an analyzer where gas bubbles are to be avoided and where purified water is required.

Referring to the figures, water to be purified such as tap water is introduced through conduit 10 into pretreatment step 12 which can comprise one or a plurality of water purification steps designed to reduce the purification requirements of the downstream reverse osmosis step 14 and to minimize fouling of the reverse osmosis membrane 16. Typical pretreatment steps include, but are not limited to, prefiltration and adsorption with activated carbon and/or ion exchange resin. The pretreated water is directed through conduit 20 to pump 22 where it is pressurized and introduced into reverse osmosis step 14. Purified water is removed through conduit 24 while waste water under a pressure between about 65 and 250 psig is removed through conduit 26. The waste water is passed through eductor 28 in order to produce a vacuum in conduit 30. A by-pass valve such, as solenoid valve 32, is utilized to control the volume of water passed through eductor 28 and thereby to control the fraction of water processed by the membrane which becomes purified. This is critical to proper operation of the membrane. Waste water is discarded through conduit 34. The conduit 30 is connected to plenum 36 so that a vacuum can be exerted in the volume 38 surrounding hollow fibers 40 formed of a hydrophobic membrane. Purified water is passed into post-treatment steps 42 such as a deionization step and an ultrafiltration step and then through conduit 44, plenum 41 and into the hollow fibers 40. Gas in the water within the hollow fibers 40 passes through the hollow fibers 40 under the influence of the vacuum in volume 38. The purified and degasified water is recovered through conduit 46. The hollow fibers 38 are surrounded by plenum 43 and a container 45. The hollow fibers 40 are sealed to the walls of plenums 41 and 43 in order to attain the fluid flow within container 45 described above.

The following example illustrates the present invention and is not intended to limit the same.

Example I

Utilizing the process configuration of FIGS. 1 and 2, four separate runs using tap water were made. The tap water had a conductivity of 95 micromho/cm and was introduced into the pretreatment step 12 at 70 psi and at a rate of 1,700 ml/min. The pretreatment step 12 consisted, in series, of a 5 micron filter, an antiscaling agent, activated carbon a final 5 micron filter. The reverse osmosis membrane 16 was a spiral wound polyamide thin film composite type which was 12 inches long by 2.5 inches diameter. The post treatment step 42 was comprised of mixed bed deionization resin. The hollow fiber 40 comprised polypropylene fibers having an inside diameter of 240 microns. The normal flow rate of reject water in conduit 26 is 1,450 ml/min and a vacuum in conduit 30 of 28.5 inches mercury are utilized to successfully practice this invention. Also solenoid valve 32 used to control water flow during membrane flushing has a 0.65 mm orfice when closed.

In, Run 1, water was treated under standard operating conditions without an eductor and without producing a vacuum. In Run 2, the reject orfice 32 was adjusted to 0.65 mm, the reverse osmosis permeate was 250 ml/min., the water product had a conductivity of 3 micromho/cm and the product recovery rate was 14.7% with 97% ionic rejection. The vacuum in line 30 was 28.5 inches mercury. In run 3, conditions were the same as Run 2 except that orfice 32 was 0.90 mm. and the recovery was reduced to 8.6% the vacuum was 21.0 inches of mercury. In Run 4, the eductor 28 preceeded the orfice 32 in series. The product recovery was 24% and the vacuum produced was 11.0 inches mercury.

TABLE I

| CASE | EDUCTOR | EDUCTOR CONFIGURATION | REJECT ORIFICE DIAMETER (MM) | VACUUM | RO RECOVERY | RO IONIC REJECTION | DISSOLVED OXYGEN OUT, PPM |
|---|---|---|---|---|---|---|---|
| 1 | NO | N.A. | 0.90 | 0.0 in. Hg | 16% | 96% | 7-10 |
| 2 | YES | PARALLEL | 0.65 | 28.5 in. Hg | 16% | 97% | 0.9 |
| 3 | YES | PARALLEL | 0.90 | 21.0 in. Hg | 8.6% | 96% | 2.9 |
| 4 | YES | SERIES | 0.90 | 11.0 in. Hg | 24% | 94% | 5.5 |

As shown in Table I, Run 2 was the most satisfactory in attaining ion removal and dissolved oxygen removal while staying within safe operating limits of the reverse osmosis membrane in accordance with this invention.

FIG. 3 shows that, with the process configuration of FIG. 1, a variety of hollow hydrophobic fibers can be utilized in the present invention.

We claim:

1. A system for purifying a degasifying water which comprises means for effecting reverse osmosis of water including a reverse osmosis membrane, an inlet, a first outlet for purified water and a second outlet for waste water at elevated pressure, an eductor for reducing pressure of a gas at to subatmospheric pressure as a result of passing said waste water at elevated pressure through said eductor, means for passing said waste water at elevated pressure from said means for effecting reverse osmosis to said eductor, means for degasifying purified water from said means for effecting reverse osmosis which comprises a first volume for said purified water, a second volume for said gas at subatmospheric pressure, and hydrophobic membrane means sealing said first volume from said second volume for providing indirect communication of said gas at subatmospheric pressure with said purifying water in said first volume, means for passing said purified water from said means for effecting reverse osmosis into said first volume, and means for effecting said gas at subatmospheric pressure in said second volume thereby to effect passage of gas from said first volume, through said membrane and into said second volume.

2. The system of claim 1 which includes a water post-treatment purifying step between said means for effecting reverse osmosis and said means for degasifying purified water.

3. The system of claim 2 wherein said hydrophobic membrane means comprises a plurality of hollow fiber membranes.

4. The system of claim 1 which includes a water pretreatment purifying step prior to said means for effecting reverse osmosis.

5. The system of claim 3 wherein said hydrophobic membrane means comprises a plurality of hollow fiber membranes.

6. The system of claim 1 which includes a water pretreatment purifying step prior to said means for effecting reverse osmosis and a water post-treatment purifying step between said means for effecting reverse osmosis and said means for degasifying purified water.

7. The system of claim 4 wherein said hydrophobic membrane means comprises a plurality of hollow fiber membranes.

8. The system of claim 1 wherein said hydrophobic membrane means comprises a plurality of hollow fiber membranes.

9. The process for purifying and degasifying water which comprises:

passing a stream of water through a reverse osmosis step to produce a purified water stream and a high pressure waste water stream, passing said high pressure waste water through an eductor to reduce pressure of a gas to subatmospheric pressure, passing said purified water stream from said reverse osmosis step through a means for degasifying water having a first volume for said purified water, a second volume for said gas at subatmospheric pressure and hydrophobic membrane means sealing said first volume from said second volume thereby to effect passage of gas from said first volume, through said membrane and into said second volume for providing indirect communication of said gas at subatmospheric pressure with said purifying water in said first volume, and recovering purified, degasified water from said second volume of said means for degasifying water.

10. The process of claim 5 wherein water to be purified and degassed is treated in a water purifying pretreatment step prior to passing said water through said reverse osmosis step.

11. The process of claim 6 wherein said hydrophobic membrane means comprises a plurality of hollow fibers.

12. The process of claim 5 wherein said water to be degassed is passed from said reverse osmosis step to a water purifying post-treatment step prior to said means for degasifying water.

13. The process of claim 7 wherein said hydrophobic membrane means comprises a plurality of hollow fibers.

14. The process of claim 5 wherein water to be purified and degassed is treated in a water purifying pretreatment step prior to passing said water through said reverse osmosis step and water to be degassed is treated in a water purifying post-treatment step prior to said means for degasifying water.

15. The process of claim 8 wherein said hydrophobic membrane means comprise a plurality of hollow fibers.

16. The process of claim 5 wherein said hydrophobic membrane means comprises a plurality of hollow fibers.

* * * * *